United States Patent
Qiu

(10) Patent No.: US 10,956,616 B2
(45) Date of Patent: *Mar. 23, 2021

(54) SECURE COMMUNICATIONS IN A BLOCKCHAIN NETWORK

(71) Applicant: Advanced New Technologies Co., Ltd., Grand Cayman (KY)

(72) Inventor: Honglin Qiu, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 99 days.

This patent is subject to a terminal disclaimer.

(21) Appl. No.: 16/045,132

(22) Filed: Jul. 25, 2018

(65) Prior Publication Data

US 2019/0036682 A1 Jan. 31, 2019

(30) Foreign Application Priority Data

Jul. 26, 2017 (CN) .......................... 201710617463.6

(51) Int. Cl.
*H04L 29/06* (2006.01)
*G06F 21/64* (2013.01)
(Continued)

(52) U.S. Cl.
CPC ............ *G06F 21/64* (2013.01); *H04L 9/0637* (2013.01); *H04L 9/0825* (2013.01); *H04L 9/30* (2013.01);
(Continued)

(58) Field of Classification Search
CPC . H04L 63/0823; H04L 63/166; H04L 9/0825; H04L 9/3265; H04L 9/3268; G06F 21/62; G06F 21/64; G06Q 2220/00
See application file for complete search history.

(56) References Cited

U.S. PATENT DOCUMENTS

| 8,392,980 B1 | 3/2013 | Ahrens et al. |
| 9,565,180 B2 | 2/2017 | Yerra |
| (Continued) | | |

FOREIGN PATENT DOCUMENTS

| CN | 102088699 | 6/2011 |
| CN | 105701372 | 6/2016 |
| (Continued) | | |

OTHER PUBLICATIONS

Baliga, The Blockchain Landscape, Persistant System, 2016.*
(Continued)

*Primary Examiner* — Minh Dinh
(74) *Attorney, Agent, or Firm* — Fish & Richardson P.C.

(57) ABSTRACT

A first certificate authority (CA) trust list comprising a plurality of CA identifiers is obtained by a first node of a blockchain network. A communication request comprising a public key certificate of the second node is received by the first node from a second node of the blockchain network. A first CA identifier is determined from the received public key certificate. A determination is made as to whether the first CA identifier matches one of the plurality of CA identifiers of the first CA trust list. In response to determining that the first CA identifier matches one of the plurality of CA identifiers of the first CA trust list, the communication request is approved by the first node. In response to determining that the first CA identifier does not match one of the plurality of CA identifiers of the first CA trust list, the communication request is denied.

8 Claims, 7 Drawing Sheets

(51) Int. Cl.
*H04W 12/00* (2021.01)
*H04L 9/06* (2006.01)
*H04L 9/08* (2006.01)
*H04L 9/30* (2006.01)
*H04L 9/32* (2006.01)
*G06F 21/62* (2013.01)

(52) U.S. Cl.
CPC .......... *H04L 9/3265* (2013.01); *H04L 9/3268* (2013.01); *H04L 63/0823* (2013.01); *H04L 63/166* (2013.01); *H04W 12/001* (2019.01); *G06F 21/62* (2013.01); *G06Q 2220/00* (2013.01)

(56) References Cited

U.S. PATENT DOCUMENTS

| | | | |
|---|---|---|---|
| 9,912,486 | B1* | 3/2018 | Sharifi Mehr ........ H04L 9/3268 |
| 2006/0282670 | A1 | 12/2006 | Karchov |
| 2011/0145578 | A1 | 6/2011 | Asano et al. |
| 2017/0353320 | A1 | 12/2017 | Yang |
| 2018/0006826 | A1 | 1/2018 | Smith et al. |
| 2018/0048461 | A1 | 2/2018 | Jutla et al. |
| 2018/0227275 | A1* | 8/2018 | Russinovich ......... H04L 9/0637 |
| 2020/0136806 | A1 | 4/2020 | Qiu |

FOREIGN PATENT DOCUMENTS

| | | |
|---|---|---|
| CN | 106301792 | 1/2017 |
| CN | 106453636 | 2/2017 |
| CN | 106789090 | 5/2017 |
| CN | 106888087 | 6/2017 |
| KR | 20090065948 | 6/2009 |
| KR | 101637854 | 7/2016 |
| KR | 101661930 | 10/2016 |
| TW | 201404122 | 1/2014 |
| TW | 201423467 | 6/2014 |
| TW | 201701179 | 1/2017 |
| WO | WO 2017065389 | 4/2017 |

OTHER PUBLICATIONS

Second Written Opinion in International Appplication No. PCT/US2018/043927, dated Jun. 26, 2019, 7 pages.

PCT International Preliminary Report on Patentability Chapter II in International Application No. PCT/US2018/043927, dated Oct. 14, 2019, 18 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

International Search Report and Written Opinion of the International Searching Authority issued in International Application No. PCT/US2018/043927 dated Sep. 24, 2018; 11 pages.

Okino, "Security Requirements for Distributed Ledger Technology: Application to Bank Account Transfer Process", Bank of Japan Financial Research Institute Discussion Paper Series, Mar. 2017, 24 pages (with partial English translation).

Watanabe et al., "Technology and Challenges of Bockchain Platforms", The Institute of Electronics, Information and Communication Engineers, Jun. 2017, 6 pages (with English Abstract).

Yoshihama et al., "Blockchain Technology and IBM's Approach", Professional Vision for Information Technology, Feb. 2017, 7 pages (with English Abstract).

* cited by examiner

700

```
┌─────────────────────────────────────────────────────────────────────┐
│  OBTAIN, BY A FIRST NODE OF A BLOCKCHAIN NETWORK, A FIRST CERTIFICATE│
│    AUTHORITY (CA) TRUST LIST COMPRISING A PLURALITY OF CA IDENTIFIERS│
│                                 702                                  │
└─────────────────────────────────────────────────────────────────────┘
                                   │
                                   ▼
┌─────────────────────────────────────────────────────────────────────┐
│  RECEIVE, BY THE FIRST NODE FROM A SECOND NODE OF THE BLOCKCHAIN     │
│  NETWORK, A COMMUNICATION REQUEST COMPRISING A PUBLIC KEY            │
│             CERTIFICATE OF THE SECOND NODE                           │
│                              704                                     │
└─────────────────────────────────────────────────────────────────────┘
                                   │
                                   ▼
┌─────────────────────────────────────────────────────────────────────┐
│    DETERMINE A FIRST CA IDENTIFIER FROM THE RECEIVED PUBLIC KEY      │
│                            CERTIFICATE                               │
│                                 706                                  │
└─────────────────────────────────────────────────────────────────────┘
                                   │
                                   ▼
                         ◇ DETERMINE WHETHER ◇
                      THE FIRST CA IDENTIFIER MATCHES ONE OF
                     THE PLURALITY OF CA IDENTIFIERS OF THE
                              FIRST CA TRUST LIST                 NO
                                      708                    ──────────┐
                                   │                                   │
                                  YES                                  │
                                   ▼                                   │
                    ┌──────────────────────────────┐                   │
                    │  APPROVE, BY THE FIRST NODE, │                   │
                    │   THE COMMUNICATION REQUEST  │                   │
                    │              710             │                   │
                    └──────────────────────────────┘                   │
                                                                       │
                    ┌──────────────────────────────┐                   │
                    │  DENY, BY THE FIRST NODE,    │◄──────────────────┘
                    │   THE COMMUNICATION REQUEST  │
                    │              712             │
                    └──────────────────────────────┘
```

FIG. 7

SECURE COMMUNICATIONS IN A BLOCKCHAIN NETWORK

CROSS-REFERENCE TO RELATED APPLICATIONS

This application claims priority to Chinese Patent Application No. 201710617463.6, filed on Jul. 26, 2017, which is hereby incorporated by reference in its entirety.

TECHNICAL FIELD

The present application relates to the field of information technologies, and in particular, to a blockchain node communication method and apparatus.

BACKGROUND

As a branch of the blockchain technology, the consortium blockchain technology is increasingly used. Blockchain nodes in a consortium blockchain network include service nodes and consensus nodes. The service node participates in a service, and the consensus node is responsible for receiving service data sent by the service node and performing consensus verification on the service data.

The previously described service node is a service server of each institution that joins the consortium blockchain network, and software is installed on the server to communicate with another node in the consortium blockchain network (the software is referred to as a "communication program" in the present application).

FIG. 1 is an architectural diagram illustrating a consortium blockchain network. As shown in FIG. 1, solid circles are consensus nodes, and hollow circles are service nodes. Different service nodes provide services for different applications (APPs). The service node sends service data generated by the APP to the consensus node for consensus verification. Assuming that a service node is a server corresponding to a catering application, another service node is a server corresponding to a payment application. A user can make a payment through the payment application after making an order through the catering application, as such, the two service nodes can participate in the same service, and can register a service relationship as shown in FIG. 1 with the consortium blockchain network.

In the consortium blockchain network, each service node stores service data of a service in which the service node participates, and the service data usually includes a user's private data. Based on the existing technology, a more secure communication method is needed.

SUMMARY

One or more implementations of the present application provide a blockchain node communication method, to resolve a problem, in the existing technology, of privacy data leakage that may be caused when service nodes in a blockchain network perform communication.

One or more implementations of the present application provide a blockchain node communications apparatus, to resolve a problem, in the existing technology, of privacy data leakage that may be caused when service nodes in a blockchain network perform communication.

The following technical solutions are used in the implementations of the present application:

A blockchain node communication method is provided. Blockchain nodes in a blockchain network include a service node. The service node stores a certificate sent by a certificate authority (CA), and is pre-configured with a CA trust list. The method includes: receiving, by a first blockchain node, a communication request sent by a second blockchain node, where the communication request includes a second certificate of the second blockchain node; determining a CA identifier that corresponds to the second certificate; determining whether the determined CA identifier that corresponds to the second certificate is included in the CA trust list; and if yes, establishing a communication connection to the second blockchain node; or if no, skipping establishing the communication connection to the second blockchain node.

A blockchain node communications apparatus is provided, and the apparatus includes: a receiving module, configured to receive a communication request sent by a second blockchain node, where the communication request includes a second certificate of the second blockchain node; a determining module, configured to determine a CA identifier that corresponds to the second certificate; and a determining and execution module, configured to determine whether the determined CA identifier that corresponds to the second certificate is included in a CA trust list; and if yes, establish a communication connection to the second blockchain node; or if no, skip establishing the communication connection to the second blockchain node; where blockchain nodes in a blockchain network include a service node, and the service node stores a certificate sent by a CA, and is pre-configured with the CA trust list.

A blockchain node communications device is provided. The communications device includes one or more processors and a memory. The memory stores a program, and the program is executed by the one or more processors to perform the following steps: receiving, at a first blockchain node, a communication request sent by a second blockchain node, where the communication request includes a second certificate of the second blockchain node; determining a CA identifier that corresponds to the second certificate; determining whether the determined CA identifier that corresponds to the second certificate is included in a CA trust list; and if yes, establishing a communication connection to the second blockchain node; or if no, skipping establishing the communication connection to the second blockchain node; where blockchain nodes in a blockchain network include a service node, and the service node stores a certificate sent by a CA, and is pre-configured with the CA trust list.

The one or more technical solutions used in the one or more implementations of the present application can achieve the following beneficial effects:

A service node in a blockchain network stores a certificate sent by a CA, and is pre-configured with a CA trust list. When receiving the communication request sent by the second blockchain node, the first blockchain node can first determine, based on the second certificate of the second blockchain node that is included in the communication request, the CA identifier that corresponds to the second certificate, and then determine whether the CA identifier that corresponds to the second certificate is included in the CA trust list. If yes, the first blockchain node establishes the communication connection to the second blockchain node; or if no, the first blockchain node does not establish the communication connection to the second blockchain node. According to the method provided in the implementations of the present application, before establishing a communication connection, the service node in the blockchain network can determine whether to establish the communication connection based on the pre-configured CA trust list and a certificate that is included in a communication request, so that a possibility of leaking privacy data by the service node can be reduced by limiting an object (for example, another service node) to which the service node can establish the communication connection, and security of data stored in the blockchain network can be improved.

BRIEF DESCRIPTION OF DRAWINGS

The accompanying drawings described here are intended to provide a further understanding of the present application, and constitute a part of the present application. The illustrative implementations of the present application and descriptions of the implementations are intended to describe the present application, and do not constitute limitations on the present application. In the accompanying drawings:

FIG. 7 is a flowchart illustrating an example of a computer-implemented method for improving security of a blockchain network, according to an implementation of the present disclosure.

DESCRIPTION OF IMPLEMENTATIONS

In a consortium blockchain network, service data generated by a service node due to the service node's participation in a service includes a user's private data. Therefore, to prevent the user's private data from being leaked to a service node that does not participate in the service, in the consortium blockchain network, each service node stores only service data of a service in which the service node participates.

However, in actual applications, for example, for a service, service node A that does not participate in the service can establish, through a communication program, a communication connection to service node B participating in the service, and use a technical means (such as database cracking) to steal service data stored in service node B. That is, each service node that establishes a communication connection through a communication program can use a technical means to obtain service data stored in another service node if communications can be established between these two service nodes. Because service data can include the user's private data, the present disclosure provides a more secure communication technology solution.

To make the objectives, technical solutions, and advantages of the implementations of the present application clearer, the following clearly describes the technical solutions of the present application with reference to corresponding accompanying drawings and one or more specific implementations of the present application. Apparently, the described implementations are merely some rather than all of the implementations of the present application. All other implementations obtained by a person of ordinary skill in the art based on the one or more implementations of the present application without creative efforts shall fall within the protection scope of the present application. The technical solutions provided in the implementations of the present application are described in detail below with reference to the accompanying drawings.

Figure 2:
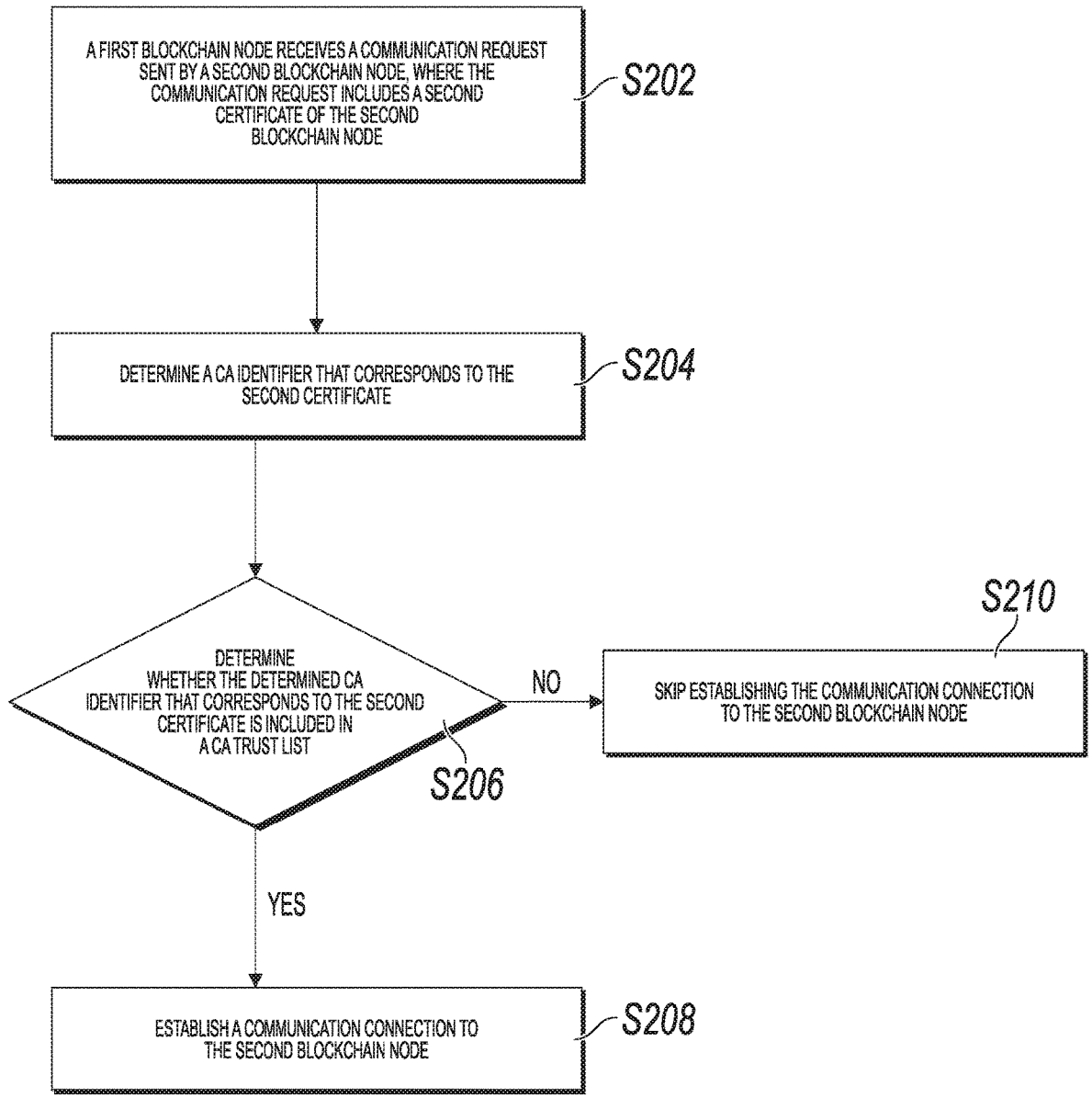
FIG. 2 is a flowchart illustrating a blockchain node communication process, according to an implementation of the present application.

FIG. 2 illustrates a blockchain node communication process according to an implementation of the present application. Blockchain nodes in a blockchain network include a service node. The service node stores a certificate sent by a certificate authority (CA), and is pre-configured with a CA trust list. The blockchain node communication process can include the following steps.

S202: A first blockchain node receives a communication request sent by a second blockchain node.

In one or more implementations of the present application, blockchain nodes in a consortium blockchain network can communicate with each other. Service nodes can communicate and transmit data to execute services. Service data generated during service execution is sent to a consensus node for consensus verification. After the service data is verified by the consensus node, the service data is stored in a blockchain. Therefore, any blockchain node in the blockchain network may receive a communication request sent by another blockchain node. For ease of description, in the implementations of the present application, an example blockchain node that receives a communication request is referred to as the first blockchain node and a blockchain node that sends a communication request is referred to as the second blockchain node. In addition, the communication request can be a request for establishing a communication connection that is sent by the second blockchain node, and the first blockchain node can determine, based on subsequent steps, whether to respond to the request and establish the communication connection to the second blockchain node.

Figure 1:
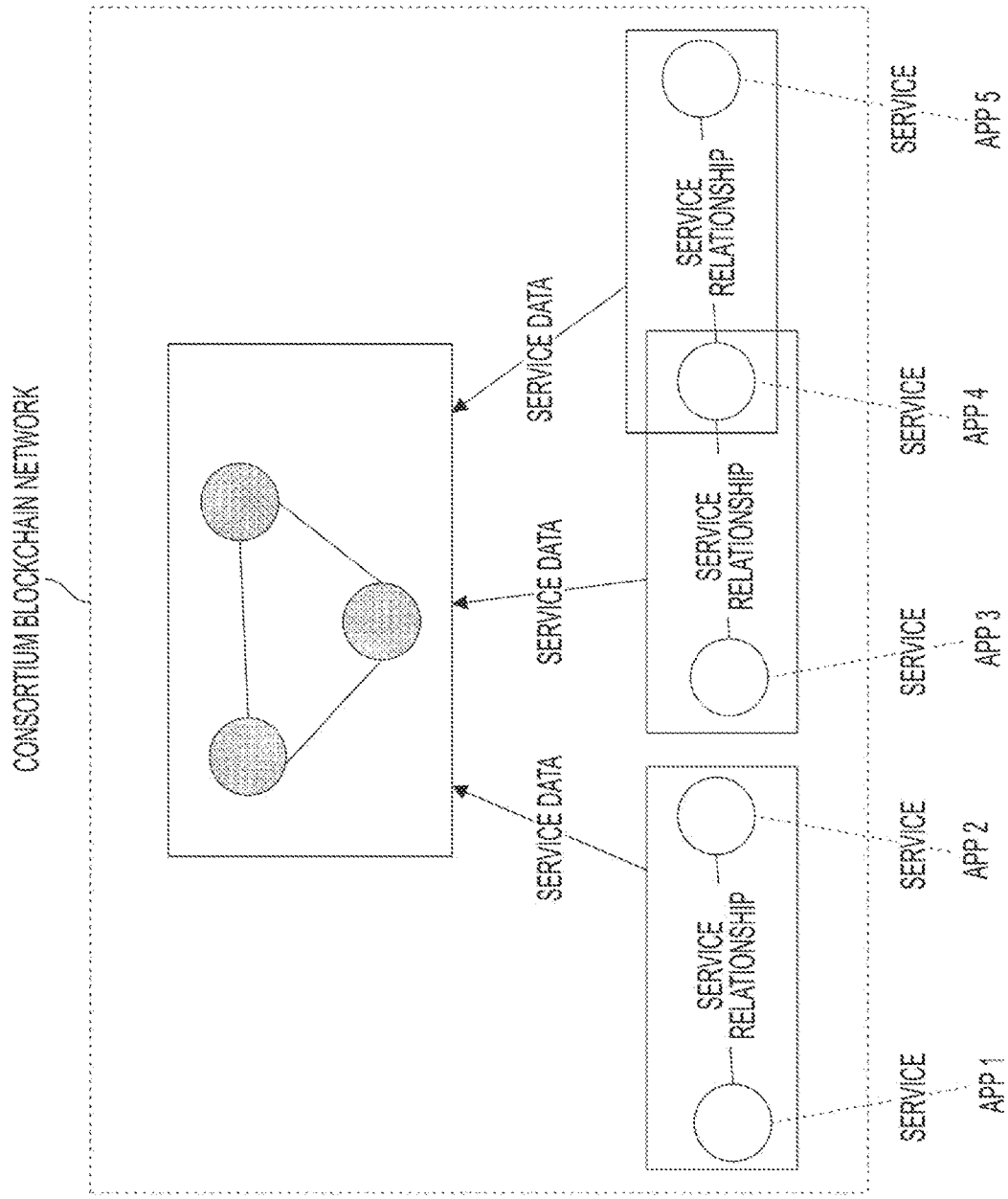
FIG. 1 is a schematic architectural diagram illustrating a consortium blockchain network.

A structure of the blockchain network can be shown in FIG. 1. The blockchain nodes can include a service node and a consensus node. Regardless of the consensus node or the service node, the blockchain node can store a certificate sent by a CA, and is pre-configured with a CA trust list.

Specifically, using the service node as an example, as shown in the architecture in FIG. 1, a plurality of service relationships can exist in the consortium blockchain network, and each service relationship includes at least two service nodes. As mentioned above, the service nodes can be service servers of institutions that are not exactly the same and that join the consortium blockchain network. Service servers in the same service relationship jointly execute a service, and send service data to a consensus node for consensus verification (for example, a seller's bank, a buyer's bank, and even an intermediate transaction platform may participate in a payment service. Therefore, in the payment service, service servers of the three institutions may perform steps that are not exactly the same in different procedures of the same service, and eventually, generate service data on which consensus verification is to be performed). For ease of description, all subsequent service nodes can be considered as service servers of institutions.

In addition, in the one or more implementations of the present application, each service relationship corresponds to one CA, or it can be considered that service nodes in the same service relationship correspond to the same CA. For each service node that executes a service in a service relationship, to configure such service node to execute a service, an identity verification request can first be sent to a CA that corresponds to the service relationship. The identity request includes an institution that the service node belongs to.

The CA can verify an identity of the service node by using methods in the existing technology, to create a certificate of the service node after the service node is verified, and return the certificate to the service node.

Therefore, in the one or more implementations of the present application, each service node can store a certificate. The certificate is sent by a CA that corresponds to the service node. As with the existing technology, the certificate can include an identifier of the service node, and a public key of the certificate includes a signature of the CA that issues the certificate. Another blockchain node can also determine, based on the certificate by using a method in the existing technology, an identity of the service node and an identifier of the CA that issues the certificate of the service node.

Further, when the second blockchain node sends the communication request to the first blockchain node, the communication request can further include a second certificate stored in the second blockchain node. The second certificate is a certificate that is issued, to the second blockchain node, by a CA that corresponds to the second blockchain node. After receiving the communication request, the first blockchain node can determine, based on the second certificate, an identity of the second blockchain node, and the CA that corresponds to the second blockchain node.

Further, in the one or more implementations of the present application, the blockchain nodes in the consortium blockchain network can establish a communication connection by using Transport Layer Security (TLS), and the second blockchain node adds, based on a TLS handshake protocol (TLS Handshake), the second certificate of the second blockchain node to the communication request sent to the first blockchain node.

It should be noted that each blockchain node is further configured with a CA trust list. The CA trust list can be sent by a CA to the blockchain node, or can be configured by the blockchain node. This is not limited in the present application. When the CA trust list is configured by the blockchain node, the CA trust list can be configured in the blockchain node based on a requirement by an institution that corresponds to the blockchain node. If the CA trust list is configured by the CA, in addition to a certificate sent by the CA, the blockchain node can further receive the CA trust list sent by the CA, and store the CA trust list. The CA trust list includes one or more CA identifiers.

In the one or more implementations of the present application, the first blockchain node and the second blockchain node can be service nodes or consensus nodes in the consortium blockchain network. When the blockchain nodes are consensus nodes, the consensus nodes can be consensus servers that are configured to perform consensus verification, and the consensus servers are provided by institutions participating in the consortium blockchain. That is, the consensus node can be considered as a server that does not belong to any institution and that does not participate in a service. Certainly, each server (for example, each service server and each consensus server) can be a separate device, or can be a system including a plurality of devices. This is not limited in the present application.

S204: Determine a CA identifier that corresponds to a second certificate.

In the one or more implementations of the present application, after receiving the communication request, the first blockchain node can determine the second certificate of the second blockchain node that is included in the communication request, and then can further determine the CA identifier that corresponds to the second certificate.

Specifically, because a certificate includes a signature of a CA that issues the certificate, after determining the second certificate included in the communication request, the first blockchain node can determine, based on a signature in the second certificate, the CA identifier of the CA that issues the certificate to the second blockchain node. That is, after receiving a communication request, a service node can determine a CA identifier of a second certificate included in the communication request.

S206: Determine whether the determined CA identifier that corresponds to the second certificate is included in a CA trust list. If yes, perform S208; or if no, perform S210.

In the one or more implementations of the present application, each blockchain node in the consortium blockchain network is configured with a CA trust list, and the CA trust list includes one or more CA identifiers. Therefore, the first blockchain node can determine, based on the CA identifier in the pre-configured CA trust list, whether the CA identifier that corresponds to the second certificate is included in the CA trust list that is configured in the first blockchain node (for example, consistent with any one of the CA identifiers in the CA trust list). That is, the first blockchain node determines whether the CA identifier that corresponds to the second certificate is trusted.

If the CA identifier that corresponds to the second certificate is included in the pre-configured CA trust list, the first blockchain node can determine that the CA identifier is trusted, and perform S208. If the CA identifier that corresponds to the second certificate is not included in the pre-configured CA trust list, the first blockchain node can determine that the CA identifier is not trusted, and perform S210.

S208: Establish a communication connection to the second blockchain node.

In the one or more implementations of the present application, when determining that the CA identifier is trusted, the first blockchain node can establish the communication connection to the second blockchain node.

Specifically, the first blockchain node can directly establish the communication connection to the second blockchain node. To further ensure communication security, the first blockchain node can also send a first certificate of the first blockchain node to the second blockchain node, and use a private key in the first certificate to encrypt data that is sent to the second blockchain node. Likewise, when sending data to the first blockchain node, the second blockchain node can also encrypt the data by using a private key in the second certificate.

Further, in the one or more implementations of the present application, the blockchain nodes in the blockchain network can establish the communication connection based on the TLS handshake protocol. Therefore, after determining to establish the communication connection to the second blockchain node, the first blockchain node can further return a verification request to the second blockchain node.

Specifically, the verification request includes the first certificate of the first blockchain node. The second blockchain node can also perform S202 to S206, to determine whether a CA identifier that corresponds to the first certificate is included in a CA trust list configured in the second blockchain node. If yes, the second blockchain node establishes the communication connection to the first blockchain node; or if no, the second blockchain node does not establish the communication connection to the first blockchain node. That is, the second blockchain node can also verify whether the CA identifier that corresponds to the first certificate of the first blockchain node is trusted. If yes, the second blockchain node establishes the communication connection to the first blockchain node; or if no, the second blockchain node does not establish the communication connection to the first blockchain node.

When establishing the communication connection, the first blockchain node and the second blockchain node can determine a key that is used in the communication by using a process similar to a TLS handshake process in the existing technology, and encrypt transmitted data by using the key. Certainly, the TLS handshake process is a relatively mature technology. Details are not described in the present application.

S210: Skip establishing the communication connection to the second blockchain node.

In the one or more implementations of the present application, when determining that the CA identifier corresponding to the second certificate is not included in the CA trust list that is configured in the first blockchain node, the first blockchain node can determine not to establish the communication connection to the second blockchain node. In addition, the first blockchain node may not need to send the verification request to the second blockchain node.

According to the blockchain node communication method shown in FIG. 2, it can be seen that a service node in a blockchain network stores a certificate sent by a CA, and is configured with a CA trust list sent by the CA. In addition, a consensus node in the blockchain network can also store a certificate sent by a CA, and is configured with a CA trust list sent by the CA. When receiving the communication request sent by the second blockchain node, the first blockchain node in the blockchain network can first determine, based on the second certificate of the second blockchain node that is included in the communication request, the CA identifier that corresponds to the second certificate, and then determine, based on the CA identifier in the pre-configured CA trust list, whether the CA identifier that corresponds to the second certificate is trusted. If yes, the first blockchain node establishes the communication connection to the second blockchain node; or if no, the first blockchain node does not establish the communication connection to the second blockchain node. According to the method provided in the one or more implementations of the present disclosure, before establishing a communication connection, the service node in the blockchain network can determine whether to establish the communication connection based on the pre-configured CA trust list and a certificate that is included in a communication request. Therefore, a possibility of leaking privacy data by the service node can be reduced by limiting the object (for example, another service node) to which the service node can establish the communication connection, improving security of data stored in the blockchain network.

In addition, the blockchain node communication method shown in FIG. 2 is applicable to both the service node and the consensus node, and there is no difference between a communication connection establishment process for the service node and a communication connection establishment process for the consensus node. Whether to establish a communication connection can be determined based on only the certificate stored in the node and a pre-configured CA trust list. The first blockchain node can be a service node or a consensus node. Likewise, the second blockchain node can be a service node or a consensus node. Certainly, because the consensus node is usually only configured to receive data that is sent by the service node and on which consensus verification is to be performed, the second blockchain node is usually the service node. This is not limited in the implementations of the present application.

Figure 3:
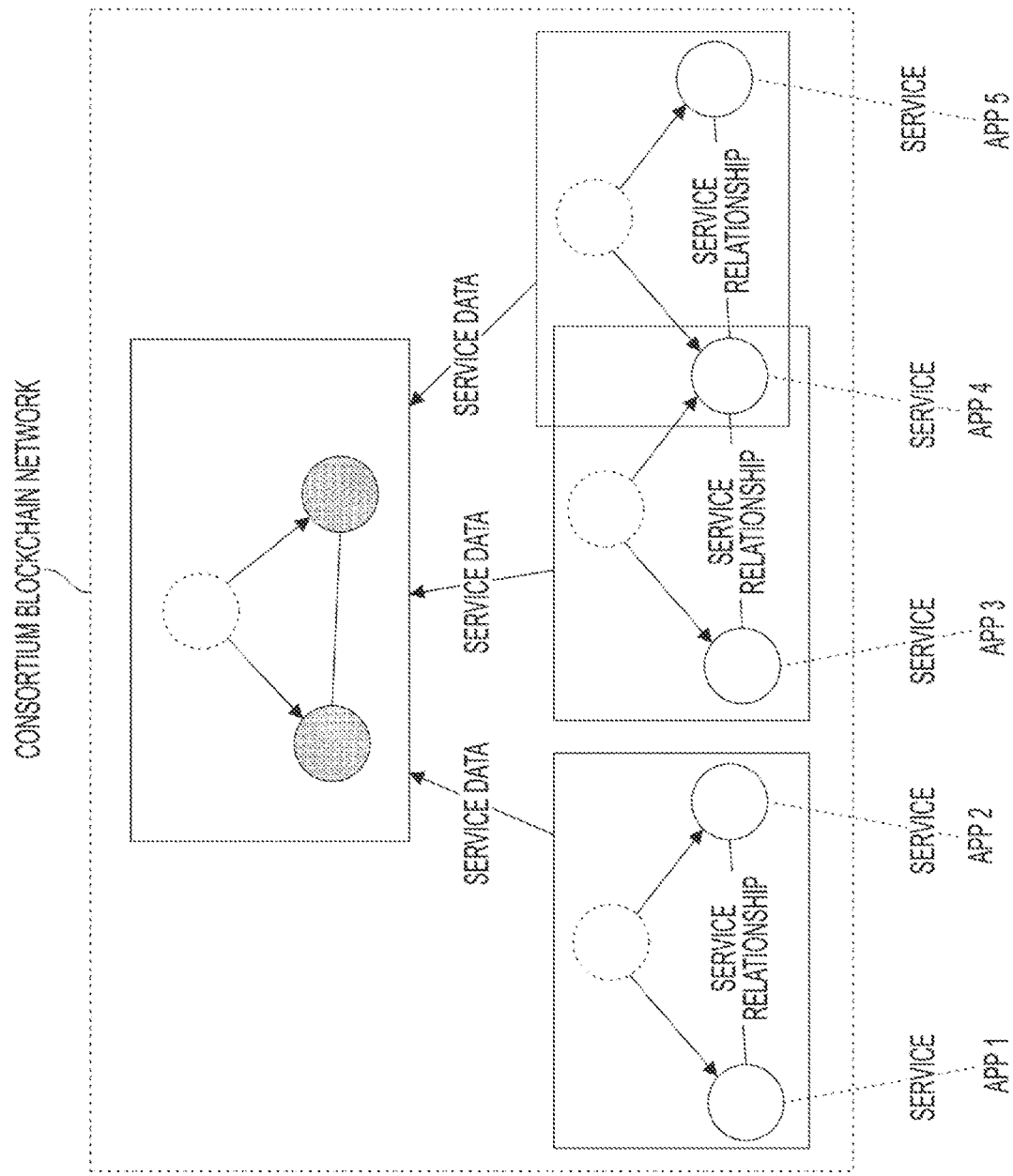
FIG. 3 is a schematic architectural diagram illustrating a consortium blockchain network, according to an implementation of the present application.

Further, using the blockchain network shown in FIG. 1 as an example, when each blockchain node corresponds to one CA, and blockchain nodes in the same service relationship can correspond to the same CA, an architecture of the consortium blockchain network can be shown in FIG. 3. It can be seen that each service relationship includes a CA (that is, a dotted circle in FIG. 3). The CA is configured to issue a certificate to each service node in the relationship. In addition, a plurality of CAs can exist in consensus nodes, and can issue certificates to different consensus nodes. Each service node can send, to a different consensus node, data on which consensus verification is to be performed. Consensus nodes that have certificates issued by the same CA perform consensus verification on the data. It should be noted that one blockchain node can receive certificates sent by a plurality of CAs, and such a blockchain node can be configured with one or more CA trust lists. When sending a communication request to another blockchain node, any certificate can be added to the communication request. This is not limited in the present application.

In addition, in an existing blockchain in which a plurality of groups of consensus nodes separately perform consensus verification, for example, a blockchain based on a Corda protocol, because blockchains stored in the consensus nodes are not exactly the same, results obtained after the consensus nodes performing consensus verification on the same service data on which consensus verification is to be performed may be different. Therefore, there may be a method (which is referred to as notary transfer in the Corda protocol) for transferring data in the blockchain. The same method can be used to transfer data in different consensus nodes in one or more implementations of the present disclosure. Details are not described in the present disclosure. Certainly, alternatively, in the one or more implementations of the present disclosure, certificates of the consensus nodes can be issued by only one CA. This is not limited in the present disclosure.

Figure 4:
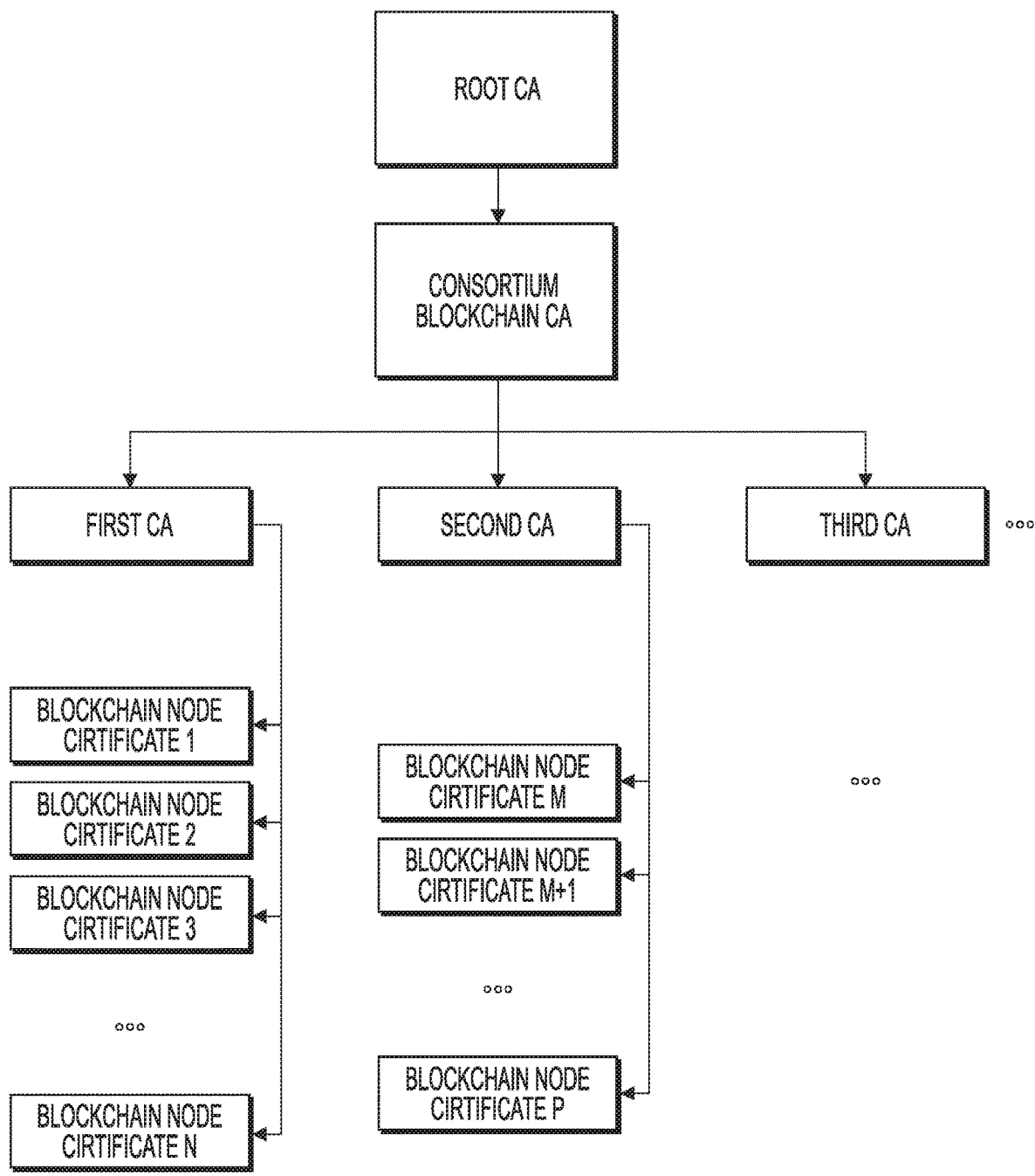
FIG. 4 is a schematic diagram illustrating a CA relationship according to an implementation of the present application.

Further, because mutual trust between a plurality of CAs in the existing technology needs to be supported by a root CA, in order to make a CA trust list that is configured in each blockchain node useable in a TLS handshake protocol to determine whether to establish a communication connection, reference can be made to FIG. 4. FIG. 4 is a schematic diagram illustrating a CA relationship according to an implementation of the present application. The root CA can be a third party CA, and a consortium blockchain CA can be created based on a certificate issued by the third party CA. The consortium blockchain CA issues certificates to CAs of blockchain nodes (for example, issuing certificates to a first CA, a second CA, and a third CA), and eventually, the CAs of the blockchain nodes send blockchain node certificates to blockchains (for example, the first CA issues a blockchain node certificate 1-n, and the second CA issues a blockchain node certificate m-p, where node certificates can be sent to blockchain nodes that are not exactly the same). Certainly, a certificate trust chain based on a certificate is a relatively mature technology. Details are not described in the implementations of the present application.

It should be noted that steps of the method provided in one or more implementations of the present disclosure can be performed by one device, or the method can be performed by different devices. For example, S202 and S204 can be performed by a device 1, and S206 can be performed by a device 2. For another example, S202 can be performed by a device 1, and S204 and S206 can be performed by a device 2. Specific implementations of the present disclosure are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

Figure 5:
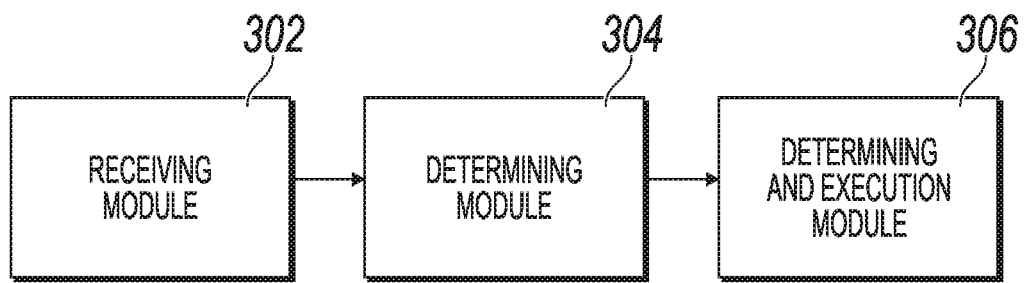
FIG. 5 is a schematic structural diagram illustrating a blockchain node communications apparatus, according to an implementation of the present application.

Based on the blockchain node communication process shown in FIG. 2, an implementation of the present application further provides a blockchain node communications apparatus, as shown in FIG. 5.

FIG. 5 is a schematic structural diagram illustrating a blockchain node communications apparatus, according to an implementation of the present application. The blockchain node communications apparatus includes: a receiving module 302, configured to receive a communication request sent by a second blockchain node, where blockchain nodes in a blockchain network include a service node, the service node stores a certificate sent by a CA, and is pre-configured with a CA trust list, and the apparatus further includes: a determining module 304, configured to determine a CA identifier that corresponds to a second certificate; and a determining and execution module 306, configured to determine whether the determined CA identifier that corresponds to the second certificate is included in the CA trust list; and if yes, establish a communication connection to the second blockchain node; or if no, skip establishing the communication connection to the second blockchain node.

The blockchain nodes further include a consensus node, and the consensus node stores a certificate sent by a CA, and is pre-configured with a CA trust list.

The blockchain nodes in the blockchain network correspond to CAs and the CAs are not the same.

The receiving module 302 receives, based on a TLS handshake protocol, the communication request sent by the second blockchain node.

The determining and execution module 306 returns a verification request to the second blockchain node, and the verification request includes a first certificate of the apparatus, so that the second blockchain node determines, based on the first certificate and a CA trust list pre-configured in the second blockchain node, whether to establish the communication connection to the apparatus.

Specifically, the blockchain node communications apparatus can be located in a blockchain node. The blockchain node can be a service node or a consensus node in the consortium blockchain network. This is not limited in the present disclosure. In addition, because the consensus node in the consortium blockchain network can also be a server provided by a member (an institution) of the consortium, the blockchain node can be a consensus server. Certainly, alternatively, when the blockchain node is a service node, the service node can also be a service server of an institution.

In addition, the server (for example, the service server or the consensus server) can be a separate device, or can be a system including a plurality of devices, such as a distributed server. However, no matter whether the server is one device or more than one device, the server in the consortium blockchain network can be considered as a blockchain node.

Figure 6:
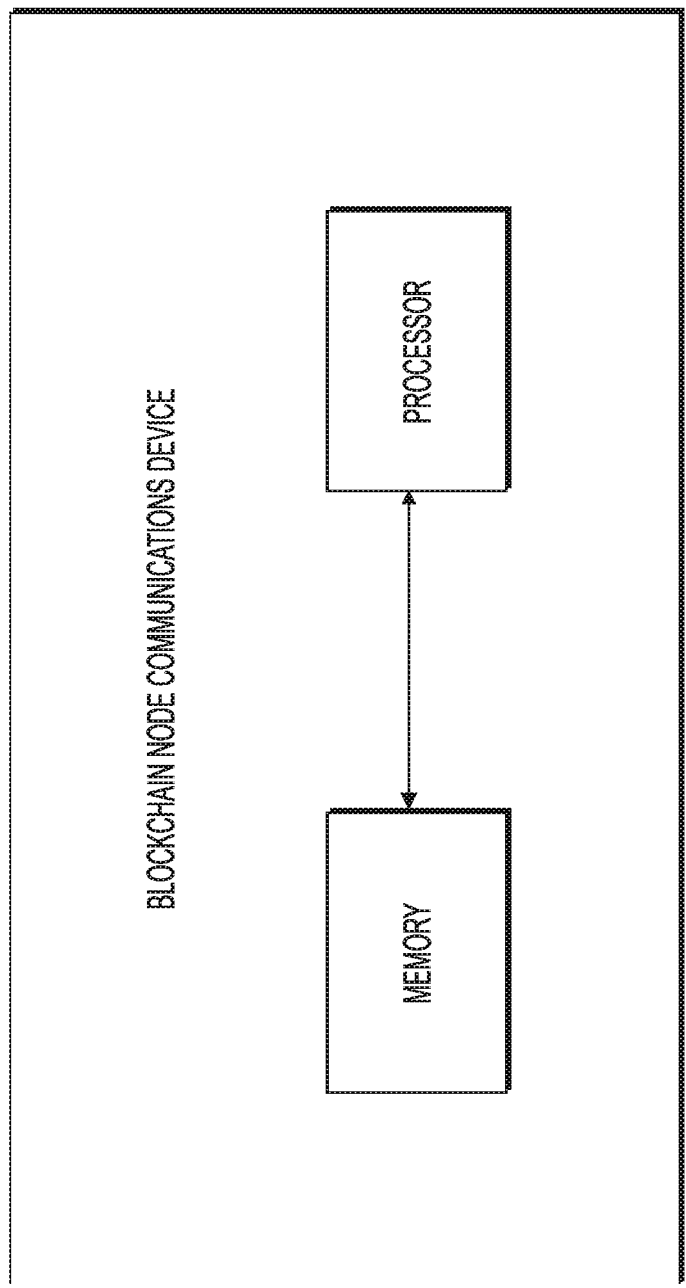
FIG. 6 is a schematic structural diagram illustrating a blockchain node communications device, according to an implementation of the present application.

Based on the blockchain node communication process shown in FIG. 2, an implementation of the present application further provides a blockchain node communications device, as shown in FIG. 6.

FIG. 6 is a schematic structural diagram illustrating a blockchain node communications device according to an implementation of the present application. The communications device includes one or more processors and a memory. The memory stores a program, and the program is executed by the one or more processors to perform the following steps: receiving, at a first blockchain node, a communication request sent by a second blockchain node, where the communication request includes a second certificate of the second blockchain node; determining a CA identifier that corresponds to the second certificate; determining whether the determined CA identifier that corresponds to the second certificate is included in a CA trust list; and if yes, establishing a communication connection to the second blockchain node; or if no, skipping establishing the communication connection to the second blockchain node.

Blockchain nodes in a blockchain network include a service node. The service node stores a certificate sent by a CA, and is pre-configured with the CA trust list.

In addition, the blockchain node can be a consensus node, and perform same steps when establishing a communication connection to another blockchain node by using the blockchain node communications device.

In the 1990s, whether technology improvement is hardware improvement (for example, improvement of a circuit structure, such as a diode, a transistor, or a switch) or software improvement (improvement of a method procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, the programming is mostly implemented by modifying "logic compiler" software instead of manually making an integrated circuit chip. This is similar to a software compiler used for program development and compiling. However, original code before compiling is also written in a specific programming language, which is referred to as a hardware description language (HDL). There are many HDLs, such as an Advanced Boolean Expression Language (ABEL), an Altera Hardware Description Language (AHDL), Confluence, a Cornell University Programming Language (CUPL), HDCal, a Java Hardware Description Language (JHDL), Lava, Lola, MyHDL, PALASM, and a Ruby Hardware Description Language (RHDL). Currently, a Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented in any appropriate manner. For example, the controller can be a microprocessor, a processor, or a computer-readable medium, a logic gate, a switch, an application-specific integrated circuit (ASIC), a programmable logic controller, or an embedded microcontroller that stores computer-readable program code (for example, software or firmware) that can be executed by the processor (or the microprocessor). Examples of the controller include but are not limited to the following microcontrollers: ARC 625D, Atmel AT91SAM, Microchip PIC18F26K20, or Silicon Labs C8051F320. A memory controller can also be implemented as a part of control logic of the memory. A person skilled in the art also knows that a controller can be implemented in a manner of pure computer-readable program code, and the steps in the method can be logically programmed to enable the controller to implement same functions in forms of a logical gate, a switch, an application-specific integrated circuit, a programmable logic controller, an embedded microcontroller, etc. Therefore, the controller can be considered as a hardware component, and an apparatus configured to implement various functions in the controller can also be considered as a structure in a hardware component. Alternatively, an apparatus configured to implement various functions can be considered as a software module that can implement the method or a structure in a hardware component.

The system, apparatus, module, or unit illustrated in the previous implementations can be implemented by using a computer chip or an entity, or can be implemented by using a product having a certain function. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the described apparatus is described by dividing functions into various units. Certainly, when the present application is implemented, the functions of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product implemented on one or more computer-usable storage media (including but not limited to a magnetic disk memory, a compact disc read-only memory (CD-ROM), and an optical memory) that include computer-usable program code.

The present disclosure is described with reference to the flowcharts and/or block diagrams of the method, the device (system), and the computer program product based on the implementations of the present disclosure. It should be understood that computer program instructions can be used to implement each procedure and/or each block in the flowcharts and/or the block diagrams and a combination of a procedure and/or a block in the flowcharts and/or the block diagrams. These computer program instructions can be provided for a general-purpose computer, a dedicated computer, an embedded processor, or a processor of another programmable data processing device to generate a machine, so that the instructions are executed by the computer or the processor of another programmable data processing device to generate an apparatus for implementing a specified function in one or more procedures in the flowcharts and/or in one or more blocks in the block diagrams.

These computer program instructions can be stored in a computer-readable memory that can instruct the computer or another programmable data processing device to work in a particular way, so that the instructions stored in the computer-readable memory generate an artifact that includes an instruction apparatus. The instruction apparatus implements a particular function in one or more procedures in the flowcharts and/or in one or more blocks in the block diagrams.

These computer program instructions can be loaded to a computer or another programmable data processing device, so that a series of operations and steps are performed on the computer or another programmable device to generate computer-implemented processing. Therefore, the instructions executed on the computer or another programmable device provide steps for implementing a specified function in one or more procedures in the flowcharts and/or in one or more blocks in the block diagrams.

In typical configuration, a computing device includes one or more processors (CPU), an input/output interface, a network interface, and a memory.

The memory can include a volatile memory, a random access memory (RAM), and/or a nonvolatile memory, etc. in a computer-readable medium, such as a read-only memory (ROM) or a flash memory. The memory is an example of the computer-readable medium.

The computer-readable medium includes persistent, non-persistent, movable, and unmovable media that can store information by using any method or technology. The information can be a computer-readable instruction, a data structure, a program module, or other data. Examples of a computer storage medium include but are not limited to a phase change RAM (PRAM), a static RAM (SRAM), a dynamic RAM (DRAM), a RAM of another type, a ROM, an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission medium. The computer storage medium can be used to store information that can be accessed by a computing device. As described in the present application, the computer-readable medium does not include transitory media, for example, a modulated data signal and a carrier.

It should be further noted that the term "include", "comprise", or any other variant is intended to cover non-exclusive inclusion, so that a process, a method, a commodity, or a device that includes a series of elements not only includes these elements, but also includes other elements that are not expressly listed, or further includes elements inherent to such a process, method, commodity, or device. An element preceded by "includes a . . . " does not, without more constraints, exclude the existence of additional identical elements in the process, method, commodity, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product implemented on one or more computer-usable storage media (including but not limited to a magnetic disk memory, a CD-ROM, and an optical memory) that include computer-usable program code.

The present application can be described in common contexts of computer executable instructions executed by a computer, such as a program module. Generally, the program module includes a routine, a program, an object, a component, a data structure, etc. executing a specific task or implementing a specific abstract data type. The present application can also be practiced in distributed computing environments. In these distributed computing environments, tasks are executed by remote processing devices that are connected by using a communications network. In the distributed computing environments, the program module can be located in local and remote computer storage media that include storage devices.

The implementations in the present application are described in a progressive way. For same or similar parts in the implementations, references can be made to the implementations. Each implementation focuses on a difference from other implementations. Particularly, a system implementation is similar to a method implementation, and therefore, is described briefly. For related parts, references can be made to related descriptions in the method implementation.

The previous descriptions are merely implementations of the present application, and are not intended to limit the present application. A person skilled in the art can make various modifications and changes to the present application. Any modifications, equivalent replacements, improvements, etc. made within the spirit and principle of the present application shall fall within the protection scope of the claims of the present application.

FIG. 7 is a flowchart illustrating an example of a computer-implemented method 700 for improving security of a blockchain network, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

In general, a distributed ledger is a consensus of replicated, shared, and synchronized digital data spread across multiple nodes without a central administrator or centralized data storage. Copies of distributed ledger are replicated and shared among the nodes of a distributed ledger network. Replication and sharing give the distributed ledger its characteristic resiliency and protection against unauthorized alteration. A blockchain network is an example of a distributed ledger.

A blockchain network, in general, can be 'permission-less' or 'permissioned.' In a permission-less blockchain network, access to the blockchain is unrestricted. However, due to the unrestricted access, permission-less blockchain may have limited applications in blockchain transactions that contain sensitive or private data, such as financial data, online transaction data, personal identification information, or proprietary data. On the other hand, 'permissioned' blockchain may be owned, controlled, and managed by a central trusted party or a group of participants in the form of a consortium. Examples of 'permissioned' blockchain include consortium blockchain network and private blockchain network.

In a consortium blockchain network, only trusted or vetted participants, or nodes, that are part of the consortium are allowed to participate in the control and maintenance of the blockchain. The copies of blockchain may be kept by each nodes of the consortium blockchain network, and access to the blockchain is limited to only the consortium nodes. This controlled sharing of blockchains among the consortium nodes can be used for recording distributed ledger transactions containing sensitive or private data.

Due to the sensitive or private data that may be stored by a consortium blockchain network, nodes of such a blockchain network may become targets of hacking attempts. Certain hacking methods may only require, for example, a communication session be established between the malicious node and the consortium node for the hacking attempt to proceed and potentially gain access to the blockchain containing private or sensitive data. Because each node of the consortium blockchain network contains a copy of the blockchain containing sensitive or private data, and because hacking methods are constantly evolving and zero-day vulnerabilities continue to be exposed, there is a need for controlling establishment of communication sessions to nodes of a blockchain network, such as a consortium blockchain network. It may be possible to achieve such control over establishment of communication sessions using public key certificates and a trust list.

At 702, a first certificate authority (CA) trust list comprising a plurality of CA identifiers is obtained by a first node of a blockchain network. A CA is an entity that issues public key certificates. A public key certificate, sometimes known as a digital certificate or an identity certificate, is typically used by a party of an online transaction in authenticating its identity, and is generally based on public key infrastructure (PKI) cryptography. Each node of a blockchain generally has an associated public key certificate used to authenticate its identity and to cryptographically sign a block to be added to the blockchain. The public key certificates are digitally signed by the CA that issued the certificates, and in doing so certifies the authenticity of the named entity of the public key certificate. As such, the task of authenticating the identity of the party presenting the public key certificate rests on the CA issuing the public key certificate. Accordingly, the integrity or the trustworthiness of the issuing CA is critical to maintaining the integrity of the certificate-based digital identity verification scheme.

In general, a malicious party can act as its own CA and self-sign a public key certificate purporting to be any entity that the malicious party wishes to impersonate. As such, one way of verifying trustworthiness of a public key certificate is to validate a chain of trust from a trusted root certificate authority to the CA that issued the public key certificate at question. An example of a chain of trust is illustrated in FIG. 4, such as the chain of trust established from blockchain node certificate 1 to the first CA to the consortium blockchain CA to the root CA. In some cases, the chain of trust can be relatively long, which results in a certain processing time associated with the validation of the chain of trust. Even in cases where the chain of trust is relatively short, each validation attempt takes a finite amount of processing time. In a blockchain application requiring high-volume, low latency, high-throughput, or combination thereof, such processing time associated with the validation of the chain of trust may result in reduced system performance.

One way of reducing processing time associated with the validation of the chain of trust is to obtain a CA trust list that contains a list of CA identifiers that can be trusted. By trusting the CAs included in the CA trust list, validation of the full chain of trust can be bypassed, which may reduce or eliminate the associated processing time. The CA trust list can be obtained in various ways. For example, a blockchain node can be pre-configured with a CA trust list. Examples of the pre-configuring include including a copy of the CA trust list in the blockchain software stored and ran on a blockchain node, and storing a copy of the CA trust list in a secure hardware module physically installed on the blockchain node. The secure hardware module may be a read-only storage, which may be beneficial for mitigating attempts to remotely edit the CA trust list in a malicious manner. As another example, the CA trust list can be received from the CA that issued the public key certificate of, and hence is trusted by, a particular blockchain node. Distribution of the CA trust list by the CA to the nodes to which the CA has issued certificates may be advantageous in streamlining the management and the updating of the CA trust list. Accordingly, in some implementations, the obtaining of the first CA trust list comprising the plurality of CA identifiers can be performed by one of: pre-configuring the first node with the first CA trust list; or receiving, from a CA associated with the first node, the first CA trust list. From 702, method 700 proceeds to 704.

At 704, a communication request comprising a public key certificate of a second node of the blockchain network is received by the first node from the second node of the blockchain network. This step may be similar to the step S202 of FIG. 2. A communication request generally refers to a request or a message exchanged over a network relaying a first network node's intent to communicate with a second network node. As part of the security measure of the blockchain network, the communication between the nodes of the blockchain network is typically secured using encryption. In order to facilitate the encryption process, and to establish the identity of the node requesting the communication, the communication request includes the public key certificate of the requesting node. The format and the content of the communication request may be standardized or implementation-specific.

Transport layer security (TLS) protocol and its predecessor secure socket layer (SSL) protocol are protocols widely used in conducting secure communication over a network between two nodes of the network. TLS and SSL protocols have handshake procedures that are used to initiate a secure communication session. As part of the handshake procedures, public key certificates are exchanged between the two network nodes through standardized procedures. As such, in some implementations, receiving, by the first node from the second node of the blockchain network, the communication request comprising the public key certificate of the second node comprises: receiving, by the first node from the second node, the communication request in accordance with a transport layer security (TLS) handshake protocol. From 704, method 700 proceeds to 706.

At 706, a first CA identifier from the received public key certificate is determined. This step may be similar to the step S204 of FIG. 2. A public key certificate generally contains various information in a standardized format as mandated by an appropriate standard, such as the X.509 standard. Issuer name, or the name of the CA that issued the certificate, is one of the standardized field of a public key certificate. As such, the issuer name contained within the public key certificate can be used, for example, as the CA identifier. As another example, a non-alphabetical identification information associated with the issuing CA, such as the authority key identifier (AKI) or the digital signature of the issuing CA, can be used as the CA identifier. In general, any information contained within the public key certificate useable to identify the CA that issued the particular public key certificate can be used as the CA identifier. In addition, the certificate also includes a subject name field, which is the name or an identification information of the owner of the public key certificate. From 706, method 700 proceeds to 708.

At 708, a determination is made as to whether the first CA identifier matches one of the plurality of CA identifiers of the first CA trust list. This step may be similar to the step S206 of FIG. 2. Determination of the match can be performed, for example, by searching for an exact match (e.g., through bit-by-bit comparison) of the first CA identifier determined from the received public key certificate with the entries of the first CA trust list. If it is determined that the first CA identifier matches one of the plurality of CA identifiers of the first CA trust list, method 700 proceeds to 710. Otherwise, if it is determined that the first CA identifier does not match one of the plurality of CA identifiers of the first CA trust list, method 700 proceeds to 712.

At 710, the communication request is approved by the first node. This step may be similar to the step S208 of FIG. 2. When the communication request is approved by the first node, the first node can establish a communication session between the first node and the second node. The established communication session may be an encrypted communication session, such as a TLS-secured communication session. Once the communication session is established, data may flow between the first and second nodes, and blockchain transactions may be performed over the established communication session.

In some implementations, additional steps may be performed after the approval by the first node before the communication session is established. For example, the second node that have initiated the communication request may also wish to perform a reciprocal identity verification of the first node prior to establishing the communication session between the two nodes. Such mutual verification of identity may improve overall security of the blockchain network. As such, in some implementations, the second node comprises a second CA trust list comprising a plurality of CA identifiers, and approving, by the first node, the communication request comprises: transmitting, by the first node to the second node, a verification request comprising a public key certificate of the first node. The verification request, for example, can be transmitted in accordance with communication protocols such as the TLS or SSL protocol. In such implementations, the method 700 further comprises: determining, by the second node, a second CA identifier from the received public key certificate of the first node; determining whether the second CA identifier matches one of the plurality of CA identifiers of the second CA trust list of the second node; in response to determining that the second CA identifier matches one of the plurality of CA identifiers of the second CA trust list, establishing a communication session with the first node; and in response to determining that the second CA identifier does not match one of the plurality of CA identifiers of the second CA trust list, denying, by the second node, establishment of the communication session with the first node. The details of the verification process by the second node may be similar to the steps 706 and 708.

At 712, the communication request is denied by the first node. This step may be similar to the step S210 of FIG. 2. When the first CA identifier does not match one of the plurality of CA identifiers of the first CA trust list, the first node denies the communication request, as the communication request may be from a malicious node, or from a node whose identity cannot be verified in accordance with the standard set by the blockchain network. The first node, in denying the communication request, may perform or withhold from performing various actions. For example, the first node may simply take no further action regarding the communication request. As another example, the first node may send a 'communication request denied' message to the second node. As yet another example, the first node may add a network identifier of the second node (e.g., MAC address or IP address) to a watch list for monitoring of suspicious activities, or to a black list to block any further communication requests from the second node whose communication request has been denied.

In general, the different nodes of the blockchain network can have public key certificates issued by different CAs. For example, the CAs may be part of a consortium blockchain network, and the public key certificates for nodes that perform one type of blockchain transactions may be issued by a first CA, and public key certificates for nodes that perform a different type of blockchain transactions may be issued by a second CA different from the first CA. As such, in some implementations, the first CA identifier of the public key certificate of the second node is different from the second CA identifier of the public key certificate of the first node. Implementing separate CAs for different transaction types may be advantageous in containing any possible security breach in one particular operation of the blockchain network and preventing the breach from spreading to other operations of the blockchain network.

In some implementations, the blockchain network of the method 700 is a consortium blockchain network.

In general, a blockchain network includes one or more consensus nodes configured to perform consensus verification across the copies of the blockchain distributed across the various nodes of the blockchain network. As such, in some implementations, the first node of the block chain network that receives the communication request or the second node that transmits the communication request is a consensus node.

After 710 or 712, method 700 stops.

The methods and apparatuses disclosed herein can improve security of a blockchain network by mitigating security threats posed by dubious or malicious CAs. By denying establishment of communication sessions with nodes whose identities are not certified by a trusted CA, security of the nodes of a consortium blockchain can be improved over nodes that do not utilize a CA trust list. Further, performance of the blockchain network implementing the disclosed methods and apparatuses may be superior to performance of conventional blockchains due to the reduced processing time associated with verification of the chain of trust of a public key certificate.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general—and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method comprising:
   receiving, by a first blockchain node of a blockchain network and from a second blockchain node of the blockchain network, a communication request that comprises a second certificate;
   determining, by the first blockchain node of the blockchain network, a certificate authority (CA) identifier that corresponds to the second certificate;
   determining, by the first blockchain node of the blockchain network, that the determined CA identifier that corresponds to the second certificate is included in a trust list that is pre-configured and stored on the first blockchain node; and
   in response to determining that the determined CA identifier that corresponds to the second certificate is included in the trust list that is pre-configured and stored on the first blockchain node, establishing, by the first blockchain node of the blockchain network, a communication connection with the second blockchain node, comprising:
      transmitting, by the first blockchain node of the blockchain network, a verification request to the second blockchain node for the second blockchain node to determine whether a CA identifier corresponding to a first certificate of the first blockchain node is included in a CA trust list that is pre-configured in the second blockchain node, wherein the verification request comprises the first certificate of the first blockchain node; and
      upon the second blockchain node determining that the CA identifier corresponding to the first certificate of the first blockchain node is included in the CA trust list that is pre-configured in the second blockchain node, establishing the communication connection with the second blockchain node.

2. The method according to claim 1, wherein blockchain nodes of the blockchain network comprise a service node and a consensus node, and the consensus node stores a certificate sent by a CA, and is pre-configured with the CA trust list.

3. The method according to claim 1, wherein each blockchain node in the blockchain network corresponds to a different CA.

4. The method according to claim 1, wherein the receiving, by the first blockchain node of the blockchain network, the communication request from the second blockchain node comprises:
   receiving, by the first blockchain node and from the second blockchain node of the blockchain network, the communication request based on a transport layer security (TLS) handshake protocol.

5. A device comprising one or more processors and one or more computer-readable memories coupled to the one or more processors and having instructions stored thereon that are executable by the one or more processors to perform operations comprising:
   receiving, by a first blockchain node of a blockchain network and from a second blockchain node of the blockchain network, a communication request that comprises a second certificate;
   determining, by the first blockchain node of the blockchain network, a certificate authority (CA) identifier that corresponds to the second certificate;
   determining, by the first blockchain node of the blockchain network, that the determined CA identifier that corresponds to the second certificate is included in a trust list that is pre-configured and stored on the first blockchain node; and in response to determining that the determined CA identifier that corresponds to the second certificate is included in the trust list that is pre-configured and stored on the first blockchain node, establishing, by the first blockchain node of the blockchain network, a communication connection with the second blockchain node, comprising:

transmitting, by the first blockchain node of the blockchain network, a verification request to the second blockchain node for the second blockchain node to determine whether a CA identifier corresponding to a first certificate of the first blockchain node is included in a CA trust list that is pre-configured in the second blockchain node, wherein the verification request comprises the first certificate of the first blockchain node; and upon the second blockchain node determining that the CA identifier corresponding to the first certificate of the first blockchain node is included in the CA trust list that is pre-configured in the second blockchain node, establishing the communication connection with the second blockchain node.

6. The device of claim 5, wherein blockchain nodes of the blockchain network comprise a service node and a consensus node, and the consensus node stores a certificate sent by a CA, and is pre-configured with the CA trust list.

7. The device of claim 5, wherein each blockchain node in the blockchain network corresponds to a different CA.

8. The device of claim 5, wherein the operations further comprise receiving, based on a TLS handshake protocol, the communication request from the second blockchain node.

* * * * *

UNITED STATES PATENT AND TRADEMARK OFFICE
CERTIFICATE OF CORRECTION

Page 1 of 1

PATENT NO. : 10,956,616 B2
APPLICATION NO. : 16/045132
DATED : March 23, 2021
INVENTOR(S) : Honglin Qiu It is certified that error appears in the above-identified patent and that said Letters Patent is hereby corrected as shown below:

On the Title Page

Item [56], Delete "Persistant" and insert -- Persistent --, therefor.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*